(12) United States Patent
Umesh et al.

(10) Patent No.: US 7,120,467 B2
(45) Date of Patent: Oct. 10, 2006

(54) RADIO COMMUNICATION METHOD AND BASE STATION

(75) Inventors: Anil Umesh, Yokohama (JP); Koichi Okawa, Yokohama (JP); Shinya Tanaka, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 96 days.

(21) Appl. No.: 10/778,355

(22) Filed: Feb. 17, 2004

(65) Prior Publication Data

US 2004/0166901 A1 Aug. 26, 2004

(30) Foreign Application Priority Data

Feb. 17, 2003 (JP) ............................. 2003-038923

(51) Int. Cl.
*H04M 1/00* (2006.01)
(52) U.S. Cl. .................. 455/562.1; 455/446; 455/455; 455/453; 370/335; 370/342
(58) Field of Classification Search ............ 455/422.1, 455/452.2, 455, 447, 450; 370/335, 342, 370/235
See application file for complete search history.

(56) References Cited

U.S. PATENT DOCUMENTS 6,275,482 B1 8/2001 Jevremovic et al.
6,487,416 B1 11/2002 Bundy et al.
6,804,214 B1 * 10/2004 Lundh et al. ............... 370/335
2004/0136342 A1 * 7/2004 Pedersen et al. ............ 370/335

FOREIGN PATENT DOCUMENTS

WO    WO 00/51368    8/2000

\* cited by examiner

*Primary Examiner*—Temica Beamer
(74) *Attorney, Agent, or Firm*—Oblon, Spivak, McClelland, Maier & Neustadt, P.C.

(57) ABSTRACT

A base station is configured to transmit a downlink signal to a mobile station located in a sector managed by the base station. The downlink signal is spread using a scrambling code. The base station has a monitor configured to monitor a change of a reception condition of an uplink common channel of the mobile station in the sector, a DOA estimator configured to estimate a direction of arrival of an uplink signal transmitted from the mobile station, in response to the change, an area border setter configured to separate the sector into a plurality of areas, by setting an area border in the sector in accordance with the estimated direction, a scrambling code assigner configured to assign a different scrambling code to each of the separated areas and a spreader configured to spread the downlink signal using the assigned scrambling code in each of the separated areas.

5 Claims, 18 Drawing Sheets

RADIO COMMUNICATION METHOD AND BASE STATION

CROSS REFERENCE TO RELATED APPLICATION

This application is based upon and claims the benefit of priority from the prior Japanese Patent Application No. P2003-038923, filed on Feb. 17, 2003; the entire contents of which are incorporated herein by reference.

BACKGROUND OF THE INVENTION

1. Field of the Invention

The present invention relates to a radio communication method and a base station for performing radio communications in a cell/sector configuration according to the code division multiple access (CDMA) system using a spectral spread processing.

Especially, the present invention relates to a radio communication method and a base station for transmitting and receiving directional beams using a plurality of antennas.

2. Description of the Related Art

Conventionally, a cellular system for covering the whole service area by disposing a plurality of base stations in the form of a cell is used in a radio communication system.

Recently, a cell/sector configuration is used in the cellular system. The cell/sector configuration separates one cell into a plurality of sectors and disposes a base station antenna in each sector, so as to form the service area.

Generally, as shown in FIGS. 1A and 1B, a three-sector configuration and a six-sector configuration are used in the recent cellular system.

As shown in FIG. 2, all downlink signals DL#1 and DL#2 are spread using scrambling codes and channelization codes over a wide frequency band. A different scrambling code is assigned to each sector, and a different channelization code is assigned to each channel in the sector.

It is possible to suppress an inter-sector interference using the scrambling codes, and to suppress an inter-channel interference in the sector using the channelization codes.

However, the number of channelization codes is limited. Therefore, there is a problem in that the channelization codes can become exhausted when communication traffic increases in the sector.

To solve the problem, the method for using a secondary scrambling code in addition to a primary scrambling code which has already been used in the sector is adopted in the conventional cellular system.

In other words, a different scrambling code is assigned to each channel which is spread by the same channelization code in one sector, so that each channel is identified. However, channels within the sector that are spread by different scrambling codes impose interference to one another.

A directional beam transmission and reception technique is known as a technique for suppressing interference power from other mobile stations (users) in the conventional radio communication system.

In the conventional radio communication system, the base station adopting the directional beam transmission and reception technique transmits the downlink signals to the mobile stations via a plurality of antennas, and receives the uplink signals from the mobile stations via the plurality of antennas.

To be more specific, the base station receives the uplink signals from each mobile station, and synthesizes the uplink antenna weights, so as to form directional beams in the uplink. Then, the base station synthesizes the downlink antenna weights from the uplink antenna weights by compensating for the amplitude and phase variations caused by the RF circuitries, so as to form directional beams in the downlink for each mobile station. The base station receives and transmits the signals using these directional beams. As a result, the interference power from other mobile stations is suppressed.

Conventionally, the directional beam transmission and reception techniques fall into two broad categories: adaptive antenna array systems and multi-beam systems.

The adaptive antenna array system can follow movements of mobile stations by using a different directional beam for each mobile station and by updating the antenna weights continuously, even though the mobile stations move.

For example, a coherent adaptive antenna array (CAAD) reception system using pilot symbols is proposed in the conventional DS-CDMA system.

On the other hand, the multi-beam system prepares fixed directional beam patterns and predetermined antenna weights generating the fixed directional beam patterns. The multi-beam system measures reception power of each directional beam. The multi-beam system performs transmission and reception processing using the directional beam pattern whose reception power has the maximum value.

Moreover, the adaptive antenna array system for performing the transmit diversity in the downlink directions is known.

Channels in the downlink directions fall into two broad categories: dedicated channels and common channels. The dedicated channel transmits signals inherent in each user of the mobile station, and the common channel transmits control signals common to all users.

FIGS. 3A and 3B show examples of transmission beam patterns PT#1 to PT#3 of the dedicated channel and the common channel which are transmitted by the base station adopting the directional beam transmission according to the adaptive antenna array technique.

As shown in FIG. 3A, the base station narrows the transmission beams PT#1 and PT#2 including the dedicated channel of each mobile station MS#1 or MS#2 using the directional beam transmission, so that the inter-user interference power can be suppressed.

On the other hand, as shown in FIG. 3B, the base station transmits the common channel using the non-directional beam PT#3, so that all mobile stations MS#1 and MS#2 can receive the common channel in the sector.

As described above, a unique primary scrambling code and a unique set of secondary scrambling codes are assigned to each sector, and a unique channelization code is assigned to each channel in the sector, in the conventional radio communication system.

The conventional radio communication system makes effective use of the channelization codes by discriminating between a combination of a predetermined channelization code and a predetermined primary scrambling code and a combination of the predetermined channelization code and a predetermined secondary scrambling code, when the channelization code is exhausted in the sector.

As shown in FIG. 4, when a propagation distance between the mobile station MS and the base station BS#1 managing the sector S#1 is different from a propagation distance between the mobile station MS and the base station BS#2 managing the sector S#2, and when the scrambling code used for the channels CH#1 and CH#2 in the sector S#1 is different from the scrambling code used for the channel CH#3 in the sector S#2, the inter-channel interference caused by the channel CH#3 onto the channels CH#1 and CH#2 can be suppressed.

As shown in FIG. 4, however, when the primary scrambling code and the secondary scrambling code are used in the sector S#1, the inter-channel interference caused by the channel CH#1 using the primary scrambling code onto the channel CH#2 using the secondary scrambling code, and vice versa, can remain at a significant level.

Therefore, there is a problem in that the conventional radio communication system cannot make effective use of the channelization codes in one sector, so that a communication capacity of the conventional radio communication system is limited, even though the secondary scrambling code is used in the sector.

In the environment adapting the conventional directional beam transmission, the interference between mobile stations can be suppressed because of the directivity of the transmission beams. However, the problem in that the interference cannot be suppressed sufficiently when the primary scrambling code and the secondary scrambling code are used in the same sector still remains.

Referring to FIGS. 5A and 5b, the above problem will be described in details.

As shown in FIG. 5A, without the use of directional beams, it is impossible to distinctively assign different scrambling codes to each mobile station MS#1 and MS#2 in accordance with a location area of each mobile station MS#1 and MS#2 in one sector, because the transmission beam PT#1 and PT#2 of each channel reaches all mobile stations MS#1 and MS#2 in the sector.

In this case, the channel using the primary scrambling code suffers the interference from all channels using the secondary scrambling codes in the same sector, and the channel using the secondary scrambling code suffers the interference from all channels using the primary scrambling codes in the same sector.

Therefore, the interference between channels using the primary scrambling codes and the secondary scrambling codes increases, so that the conventional radio communication system cannot make effective use of the channelization codes.

On the other hand, as shown in FIG. 5B, the base station transmits the narrowed transmission beams PT#1 to PT#3 including each channel to the mobile stations MS#1 to MS#3, when the directional beam transmission and reception is adopted. Therefore, each channel does not suffer the interference from all channels using the different scrambling codes in the same sector.

However, when there a plurality of mobile stations MS#2 and MS#3 using different scrambling codes in the same direction from the base station, the overlapped transmission beams PT#2 and PT#3 cause the interference.

In other words, the mobile station MS#1 does not suffer the interference, but the mobile stations MS#2 and MS#3 suffer the interference from each other in FIG. 5B.

BRIEF SUMMARY OF THE INVENTION

In view of the foregoing, it is an object of the present invention to provide a radio communication system and a base station which can effectively mix the channels using the primary scrambling code and the secondary scrambling code in the same sector, and can increase the communication capacity by avoiding the interference limiting the usage of the channelization codes.

A first aspect of the present invention is summarized as a base station for transmitting a downlink signal to a mobile station located in a sector managed by the base station. The downlink signal is spread using a scrambling code. The base station includes a monitor, a DOA estimator, an area border setter, a scrambling code assigner, and a spreader. The monitor is configured to monitor a change of a reception condition of an uplink common channel of each mobile station in the sector. The DOA estimator is configured to estimate a direction of arrival (DOA) of an uplink signal transmitted from a mobile station, in response to the change. The area border setter is configured to separate the sector into a plurality of areas, by setting an area border in the sector in accordance with the estimated direction. The scrambling code assigner is configured to assign a different scrambling code to each of the separated areas. The spreader is configured to spread the downlink signal using the assigned scrambling code in each of the separated areas.

A second aspect of the present invention is summarized as a base station for transmitting a downlink signal to a mobile station located in a sector managed by the base station. The downlink signal is spread using a scrambling code and a channelization code. The base station includes an area border setter, a scrambling code assigner, and a spreader. The area border setter is configured to separate the sector into a plurality of areas, by setting an area border in the sector, in accordance with the channelization code usage rate in the sector. The scrambling code assigner is configured to assign a different scrambling code to each of the separated areas. The spreader is configured to spread the downlink signal using the assigned scrambling code and the channelization code in each of the separated areas.

A third aspect of the present invention is summarized as a radio communication method for transmitting a downlink signal to a mobile station located in a sector managed by a base station. The downlink signal is spread using a scrambling code. The radio communication method includes the following steps of: (A) monitoring a change of a reception condition of an uplink common channel of each mobile station in the sector; (B) estimating a direction of arrival of an uplink signal transmitted from a mobile station, in response to the change; (C) separating the sector into a plurality of areas, by setting an area border in the sector in accordance with the estimated direction; (D) assigning a different scrambling code to each of the separated areas; and (E) spreading the downlink signal using the assigned scrambling code in each of the separated areas.

A fourth aspect of the present invention is summarized as a radio communication method for transmitting a downlink signal to a mobile station located in a sector managed by a base station. The downlink signal is spread using a scrambling code and a channelization code. The radio communication method includes the following steps of: (A) separating the sector into a plurality of areas, by setting an area border in the sector, in accordance with the channelization code usage rate in the sector; (B) assigning a different scrambling code to each of the separated areas; and (C) spreading the downlink signal using the assigned scrambling code and the channelization code in each of the separated areas.

DETAILED DESCRIPTION OF THE INVENTION

[First Embodiment]

Figure 1B:
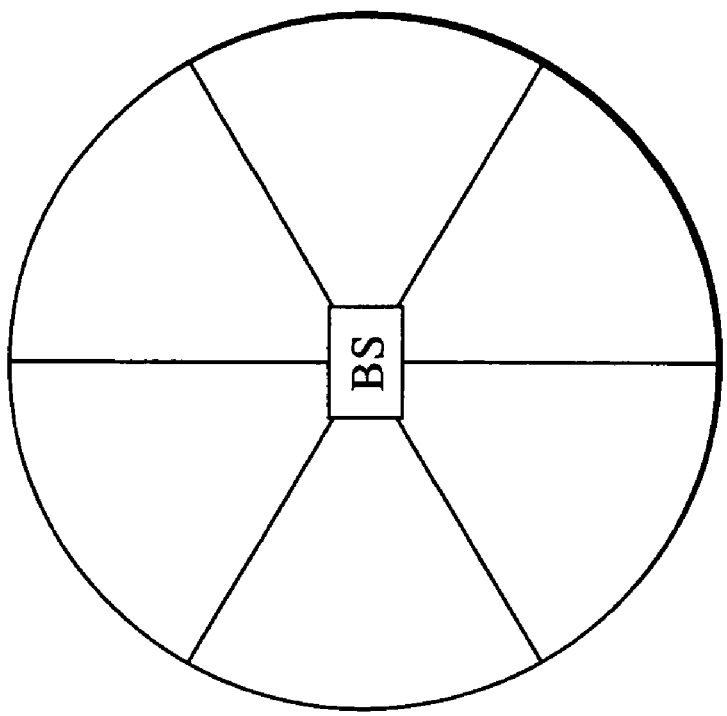
FIGS. 1A and 1B are explanatory views showing cell/sector configurations in the conventional radio communication system.
Figure 1A:
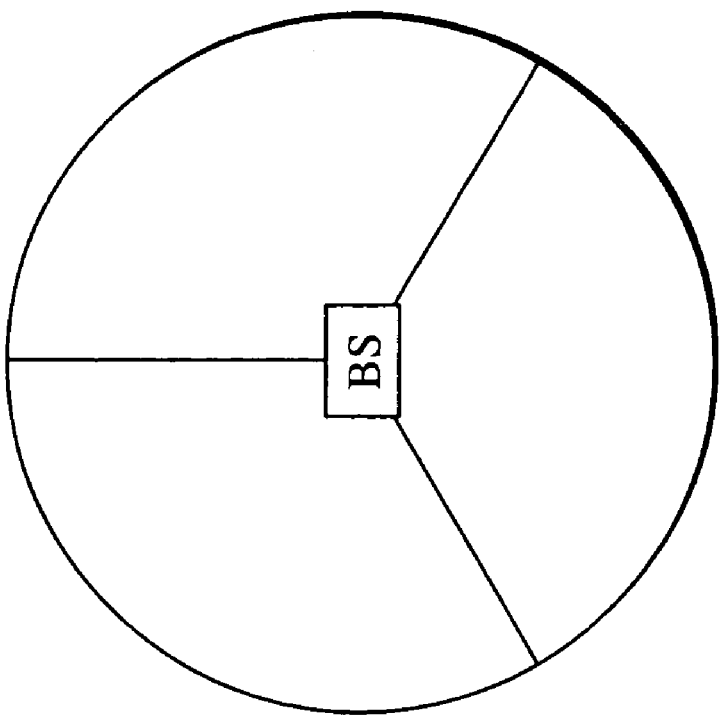
Figure 2:
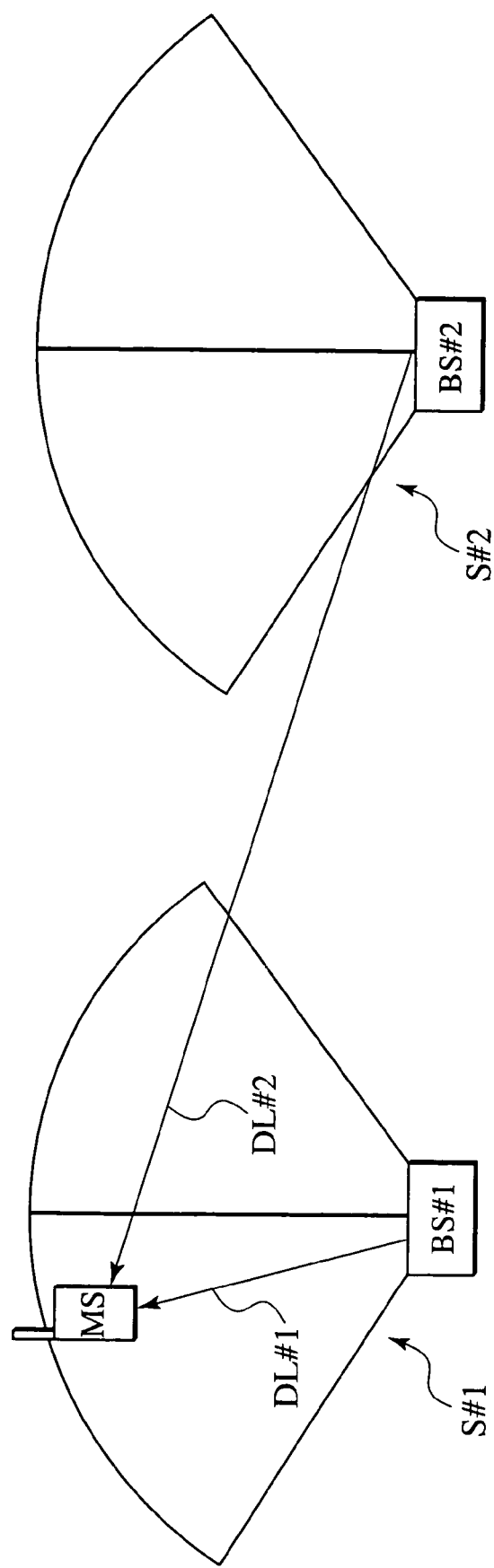
FIG. 2 is an explanatory view showing interference between sectors in the conventional radio communication system.
Figure 3A:
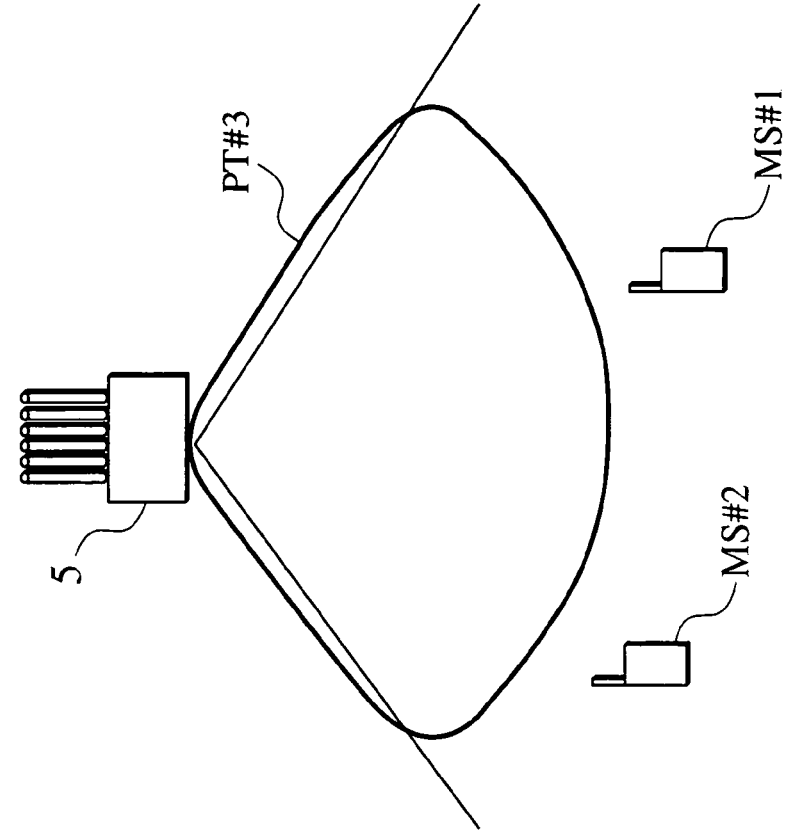
FIGS. 3A and 3B are explanatory views showing beam patterns in the conventional radio communication system.
Figure 3B:
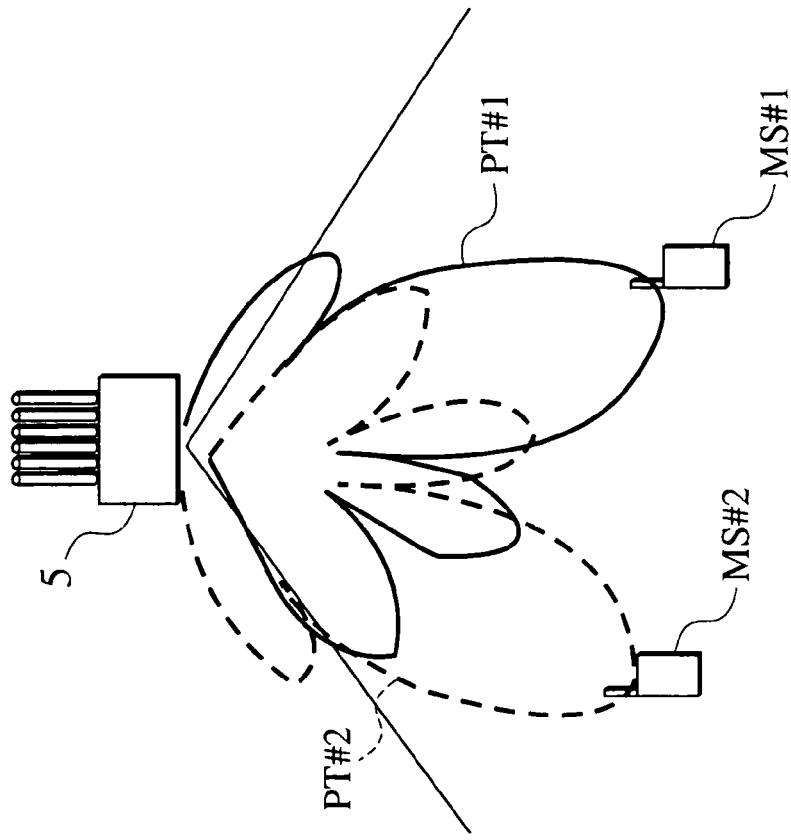
Figure 4:
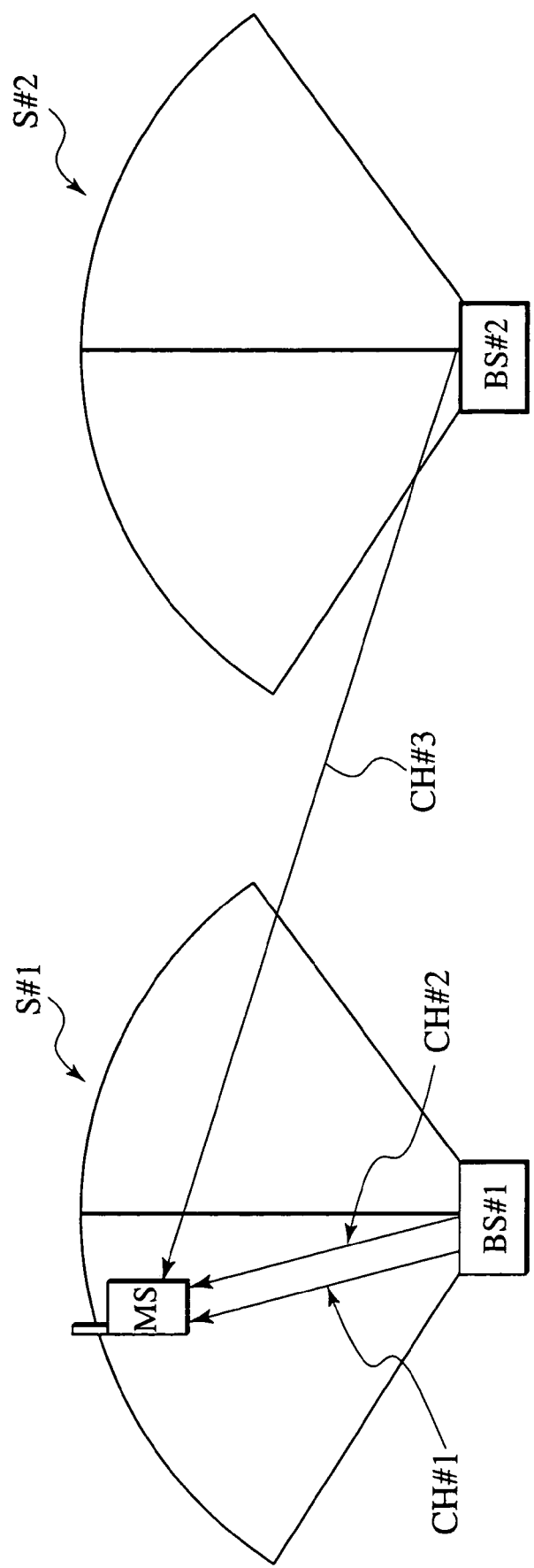
FIG. 4 is an explanatory view showing interference between sectors and interference between channels in the same sector spread with different scrambling codes in the conventional radio communication system.
Figure 5A:
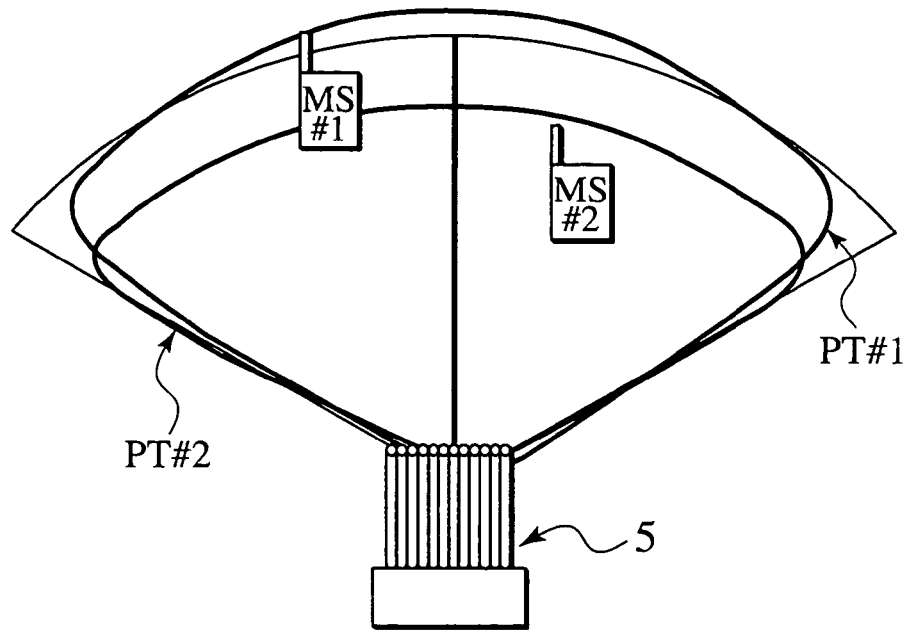
FIGS. 5A and 5B are explanatory views showing interference between channel in a system adopting the directional beam transmission and reception processing according to the conventional radio communication system.
Figure 5B:
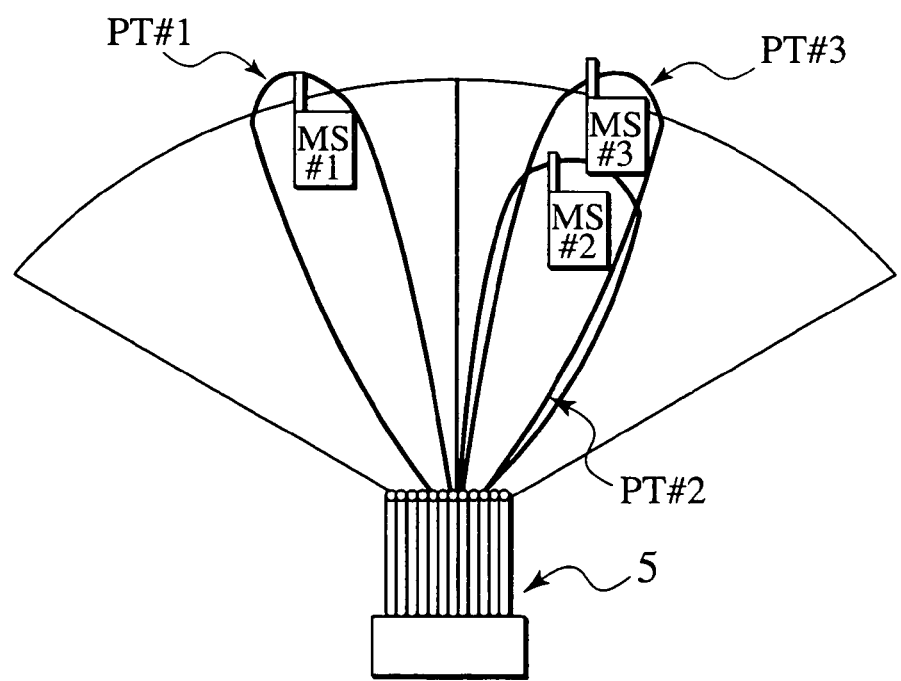
Figure 6:
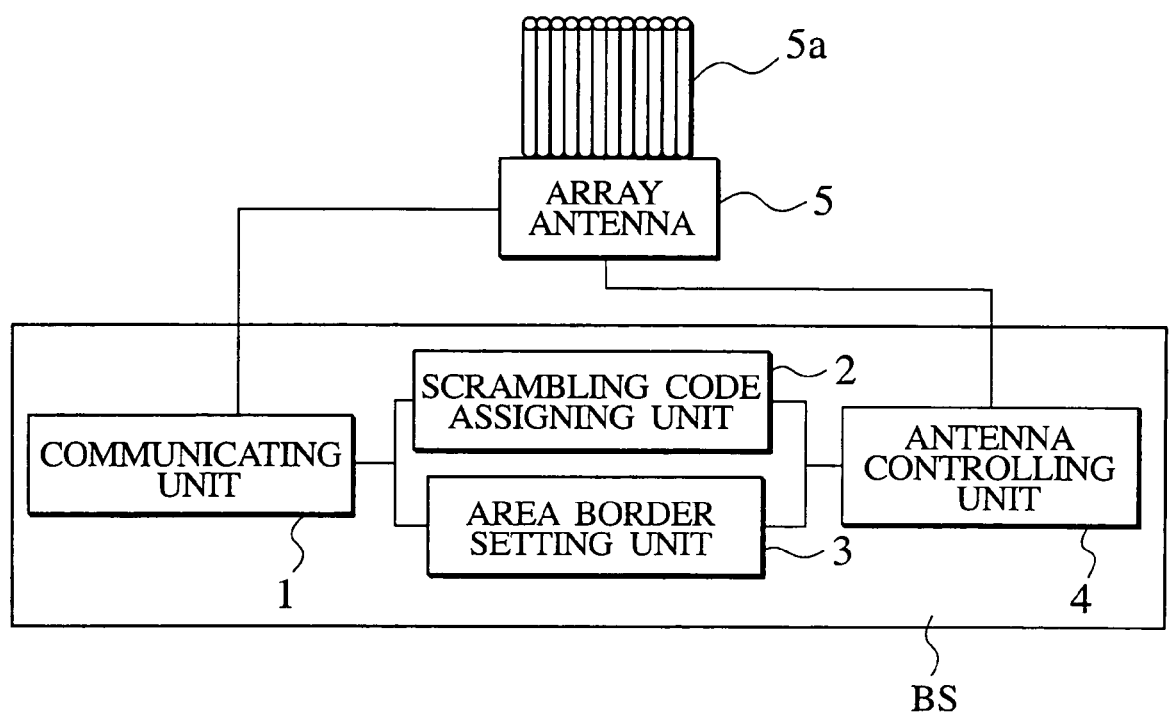
FIG. 6 is a block diagram showing a configuration of a base station in a radio communication system according to a first embodiment.
Figure 7:
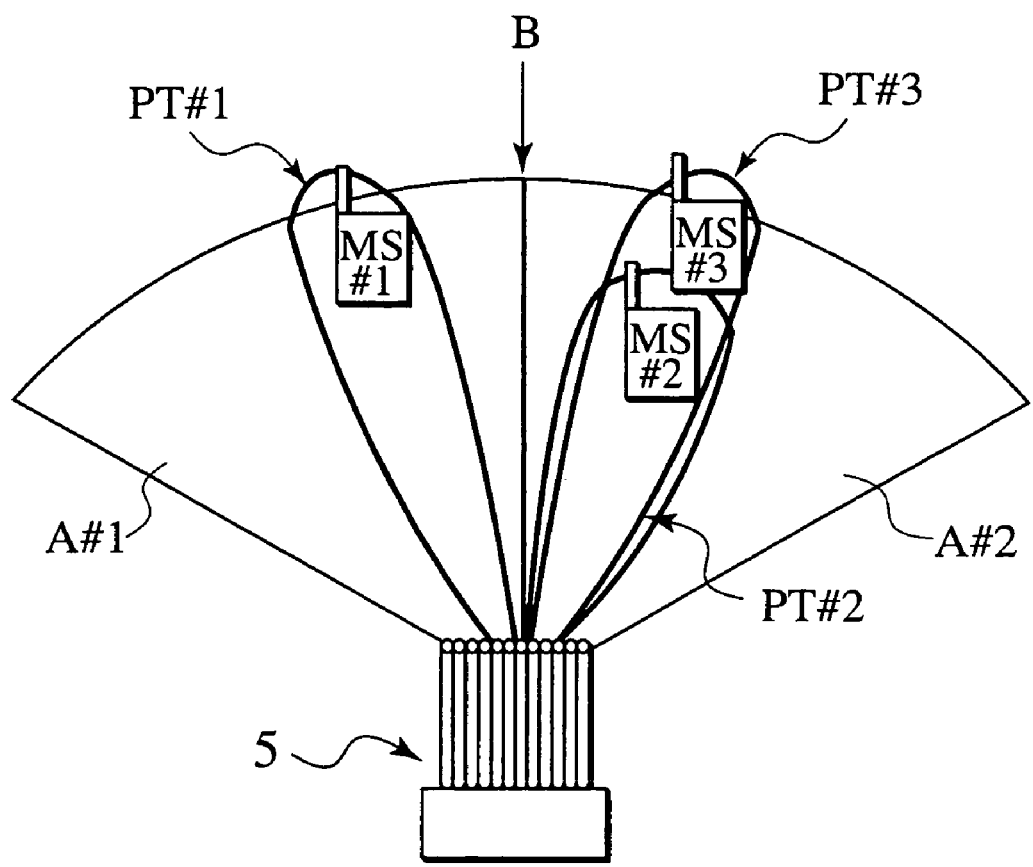
FIG. 7 is an explanatory view showing a cell/sector configuration in the radio communication system according to the first embodiment.

Referring to FIG. 6 and FIG. 7, a description will be given of a first embodiment of the present invention. FIG. 6 shows a configuration of a base station BS in a radio communication system according to the first embodiment.

The radio communication system according to the first embodiment is configured to assign a different scrambling code to each sector, to assign a different channelization code to each channel in the sector, and to spread the channel over a wide frequency band using the scrambling code and the channelization code. Both the primary scrambling code and the secondary scrambling code are used as the scrambling code in the first embodiment.

The radio communication system according to the first embodiment is configured with a plurality of mobile stations MS located in a plurality of cells and a plurality of base stations BS disposed in each cell.

As shown in FIG. 6, the base station BS has a communicating unit 1, a scrambling code assigning unit 2, an area border setting unit 3, an antenna controlling unit 4, and an array antenna 5.

The communicating unit 1 is a communication module configured to transmit/receive downlink/uplink signals to/from the mobile stations MS located in the cell via the array antenna 5.

The communicating unit 1 spreads the downlink signal using a scrambling code assigned in each of areas.

The scrambling code assigning unit 2 is a module configured to assign the scrambling code (the primary scrambling code or the secondary scrambling code) to the downlink signal to be transmitted via the communicating unit 1.

The scrambling code assigning unit 2 assigns a different scrambling code to each of the areas.

The area border setting unit 3 is a module configured to separate the sector (or the cell) into a plurality of areas A#1 and A#2, by setting an area border in the sector (or the cell).

The antenna controlling unit 4 is a module configured to control the transmission beam pattern radiated by the array antenna 5.

The array antenna 5 is configured with a plurality of antenna elements 5a. The base station BS communicates with the mobile stations MS located in a plurality of sectors in the cell using the directional beam transmission and reception processing of the array antenna 5.

As shown in FIG. 7, the antenna array 5 of the base station BS transmits the downlink signals which are spread using two type of scrambling codes (the primary scrambling code and the secondary scrambling code) to each area A#1 and A#2 by the directional beam patterns PT#1 and PT#2.

In other words, the scrambling code assigning unit 2 assigns the primary scrambling code and the secondary scrambling code to the downlink signals to be transmitted and received in the area A#1 and A#2 respectively.

The area A#1 is located at the left of an area border B set by the area border setting unit 3, and the area A#2 is located at the right of the area border B. Only the primary scrambling code is used in the area A#1, and only the secondary scrambling code is used in the area A#2.

As described above, the radio communication system according to the first embodiment can prevent the transmission beams from overlapping in the area, and can prevent the mutual interference occurring in the area, by setting the area border B and by using different scrambling codes in each area A#1 or A#2 located at the left or right of the area border B.

To be more specific, when the directional beams for the mobile station MS#2 and MS#3 overlaps in the area A#2, and when the same scrambling codes (the secondary scrambling codes) are used for the mobile stations MS#2 and MS#3, no interference between the channels for the mobile stations MS#2 and MS#3 occurs, because the channelization codes assigned to the downlink signals included in the directional beams are orthogonal each other.

In the result, the radio communication system according to the first embodiment can make the most effective use of the channelization codes and can increase the communication capacity, because no interference occurs between channels using the different scrambling codes when only one scrambling code is assigned to each area in the sector adopting the directional beam transmission and reception processing.

The radio communication system according to the first embodiment assigns different scrambling codes (for example, the primary scrambling code and the secondary scrambling code) to each separated area, so as to prevent the channels using the different scrambling codes from mixing in the same area, to prevent the inter-channel interference from occurring, to reduce the limitation of the effective use of the channelization codes, and to increase the communication capacity.

The radio communication system according to the first embodiment can separate the sector (cell) into the plurality of areas by controlling a horizontal angle of a directional beam to be transmitted and received in accordance with the set area border, so as to prevent the channels using the different scrambling codes from mixing in the same area effectively.

[Second Embodiment]

Figure 8:
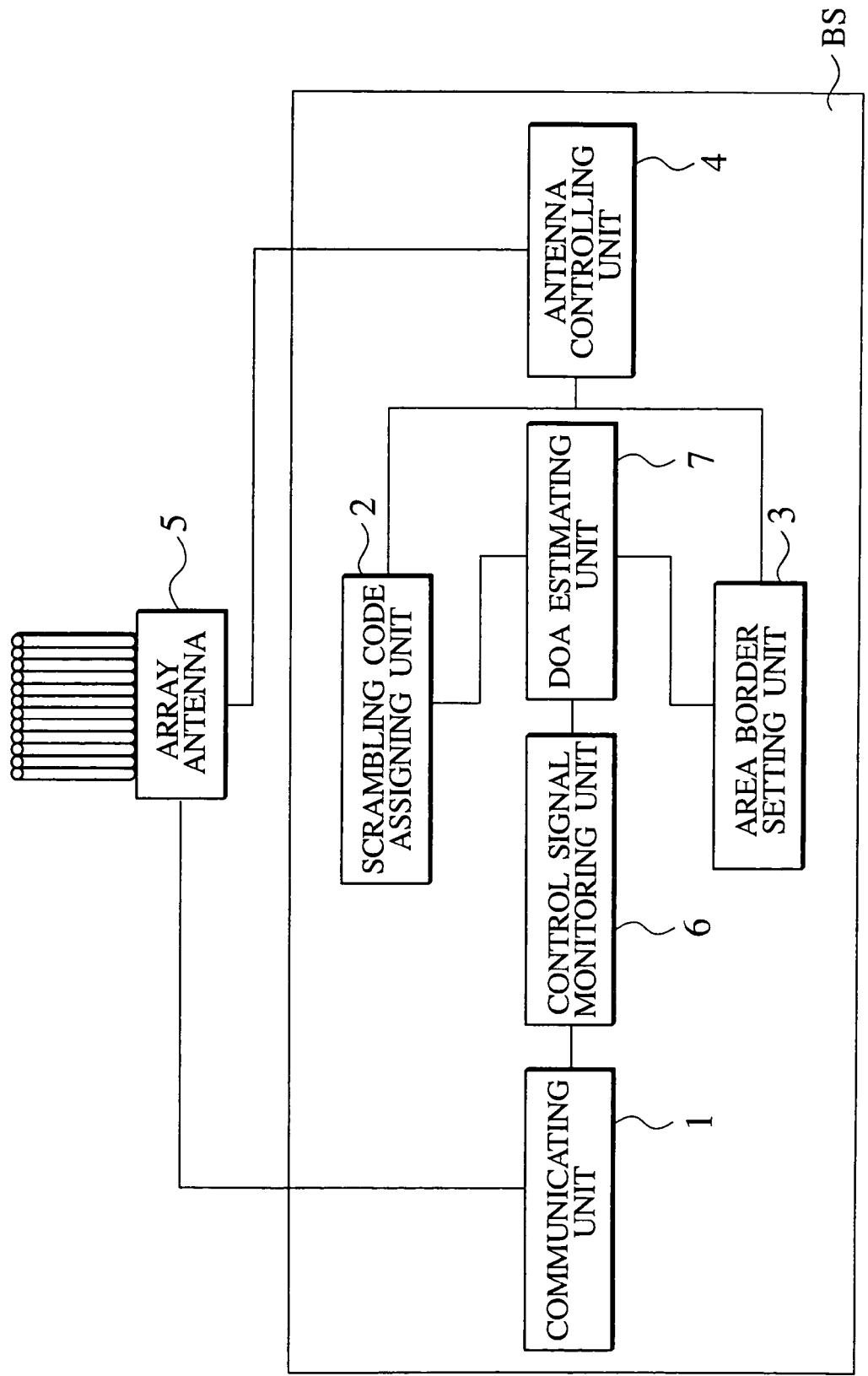
FIG. 8 is a block diagram showing a configuration of a base station in a radio communication system according to a second embodiment.

Referring to FIG. 8 to FIG. 12, a description will be given of a second embodiment of the present invention. FIG. 8 shows a configuration of a base station BS in a radio communication system according to the second embodiment.

As is the case of the first embodiment, both the primary scrambling code and the secondary scrambling code are used in the sector in the second embodiment.

In the second embodiment, the base station BS is configured to estimate a direction of arrival (DOA) of an uplink signal transmitted from a mobile station MS, and to judge the sector in which each mobile station MS is located, in accordance with the estimated DOA.

As shown in FIG. 8, the base station BS according to the second embodiment further has a control signal monitoring unit 6 and a DOA estimating unit 7, in addition to the functions of the base station BS according to the first embodiment.

The control signal monitoring unit 6 is a module configured to periodically monitor the control signal such as a pilot signal which is included in the uplink common channel received by the communication unit 1. The control signal monitoring unit 6 analyses the content of the control signal.

When the control signal monitoring unit 6 receives the control signal, the control signal monitoring unit 6 outputs the received control signal and a trigger signal to the DOA estimating unit 7.

In other words, the control signal monitoring unit 6 monitors a change of a reception condition of a common uplink channel for each mobile station MS in the sector.

The DOA estimating unit 7 is a module configured to estimate the DOA of the received control signal, in response to the trigger signal transmitted from the control signal monitoring unit 6.

In other words, the DOA estimating unit 7 estimates the DOA of a signal transmitted from a mobile station MS, in response to the change of the reception condition of the common channel in the sector.

The DOA estimating unit 7 outputs the estimated DOA to the scrambling code assigning unit 2 and the area border setting unit 3.

For example, the base station BS scans all directions of a main lobe of the array antenna 5 every unit angle (for example, a 1-degree angle), so as to calculate the direction in which the reception power after the array synthesis is the largest, as the estimated DOA.

The area border setting unit 3 is configured to separate the sector into a plurality of areas, by setting the area border in the sector in accordance with the estimated DOA.

Figure 9A:
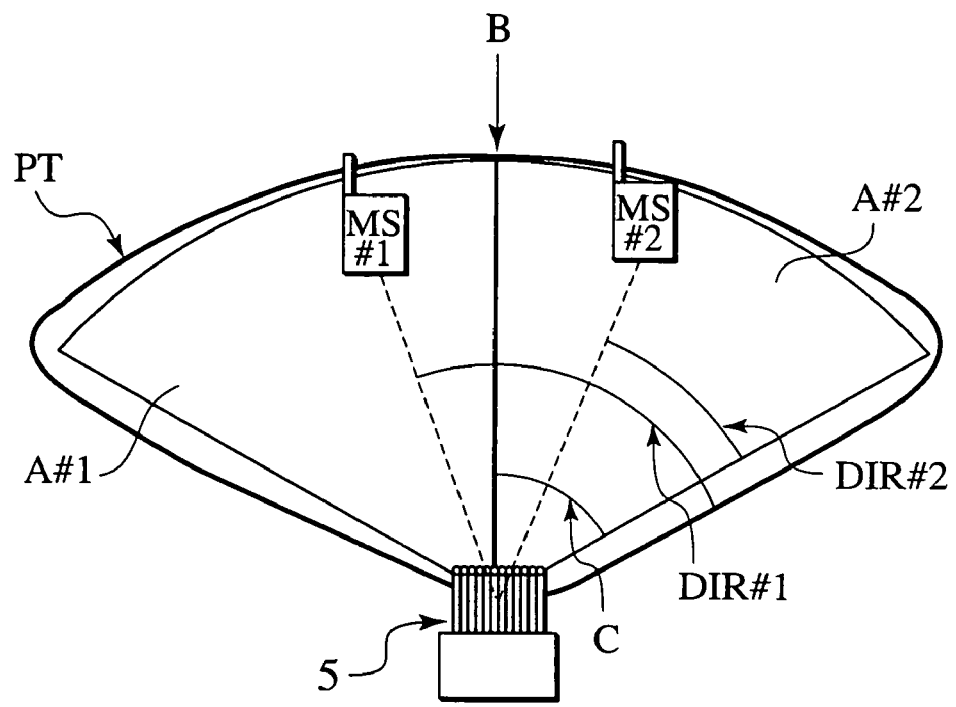
FIGS. 9A and 9B are explanatory views showing cell/sector configurations in the radio communication system according to the second embodiment.
Figure 9B:
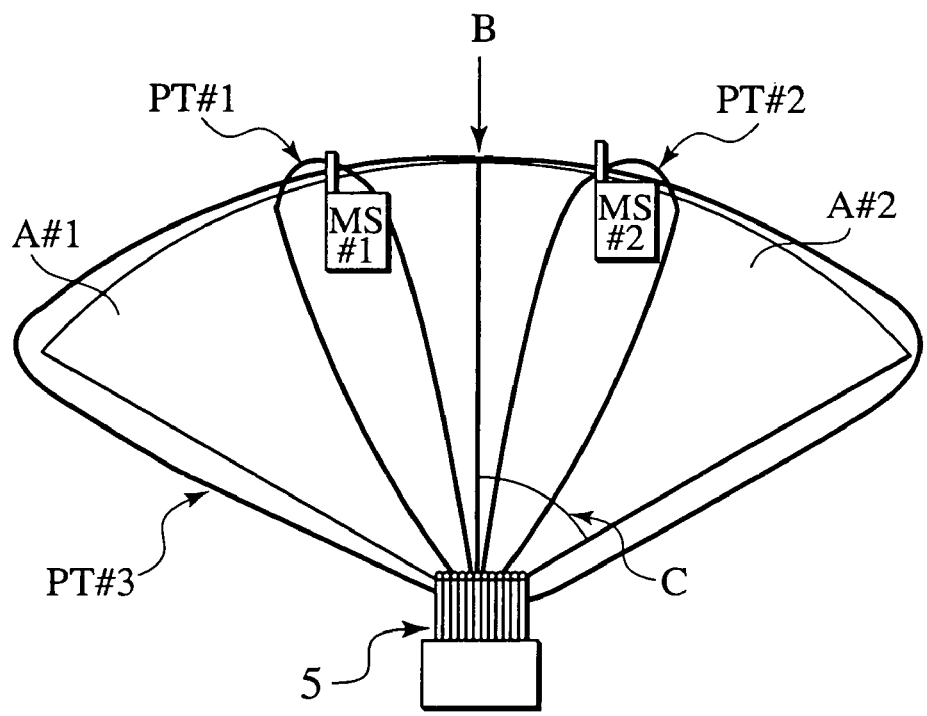
Figure 10:
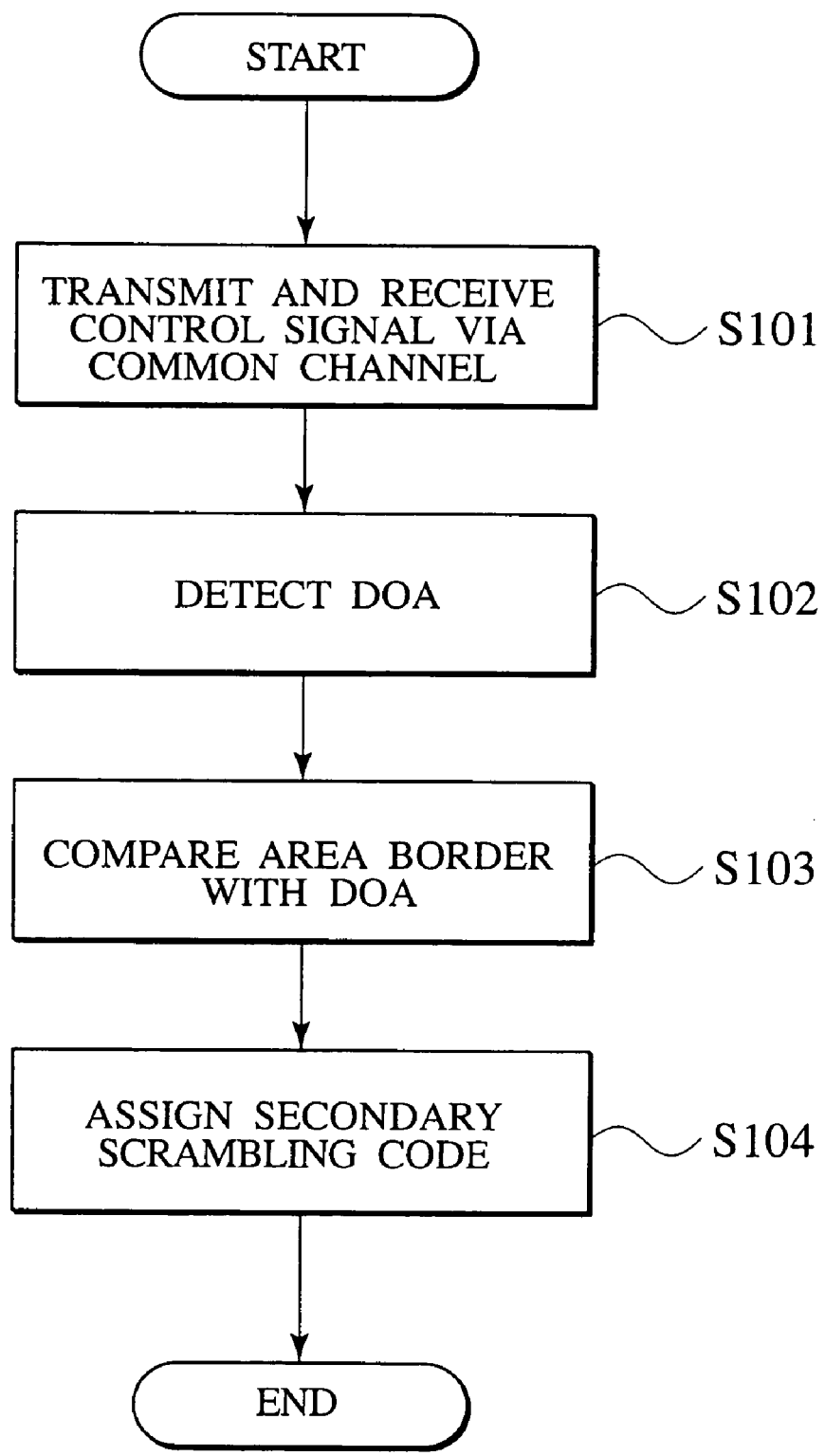
FIG. 10 is a flowchart showing an operation of the radio communication system according to the second embodiment.

The operation of the radio communication system according to the second embodiment will be described as follows. FIGS. 9A and 9B explain a state of the areas A#1 and A#2 in the radio communication system according to the second embodiment. FIG. 10 shows an operation of the radio communication system according to the second embodiment.

As shown in FIG. 10, in step S101, the base station BS transmits/receives the control signal to/from the mobile stations MS#1 and MS#2 located in the areas A#1 and A#2 respectively via the common channels.

To be more specific, as shown in FIG. 9A, the base station BS transmits the downlink common control signal to the mobile stations MS#1 and MS#2 which are located in the sector but are not transmitting data to the base station BS. Then, the control signal monitoring unit 6 monitors the uplink common channel, and outputs the trigger signal to the DOA estimating unit 7 when the uplink control signal is received from the mobile stations.

In step S102, the DOA estimating unit 7 performs the DOA estimation using the received uplink signal in response to the trigger signal, so as to detect the bearing angles DIR#1 and DIR#2 of the mobile stations MS#1 and MS#2 (the DOA of the control signals transmitted from the mobile stations MS#1 and MS#2)

In the examples of FIGS. 9A and 9B, the mobile station MS#1 is located in the area A#1, and the mobile station MS#2 is located in the area A#2.

In step S103, the area border setting unit 3 compares the bearing angles DIR#1 and DIR#2 detected by the DOA estimating unit 7 with the set angle C for setting the area border B of the primary scrambling code and the secondary scrambling code.

In the examples of FIGS. 9A and 9B, the bearing angles DIR#1 of the mobile station MS#1 is larger than the set angle C, and the bearing angles DIR#2 of the mobile station MS#2 is smaller than the set angle C.

In step S104, the scrambling code assigning unit 2 assigns the scrambling code to each mobile station MS#1 and MS#2 (each channel for each mobile station MS#1 or MS#2), in accordance with the comparison result.

The radio communication system according to the second embodiment can set the area border B and can distinctively assign the scrambling code to each area A#1 and A#2 after estimating the DOA (the bearing angles) of the mobile stations MS#1 and MS#2 using the common channels, so as to assign the scrambling codes in accordance with the location of the mobile stations MS#1 and MS#2.

The radio communication system according to the second embodiment can estimate the location of the mobile stations MS#1 and MS#2 using the common channels over the whole cell, so as to assign the appropriate scrambling codes and to set the appropriate area border B when the communication starts, without transmitting and receiving a special signal for estimating the location of the mobile stations MS#1 and MS#2.

Figure 11:
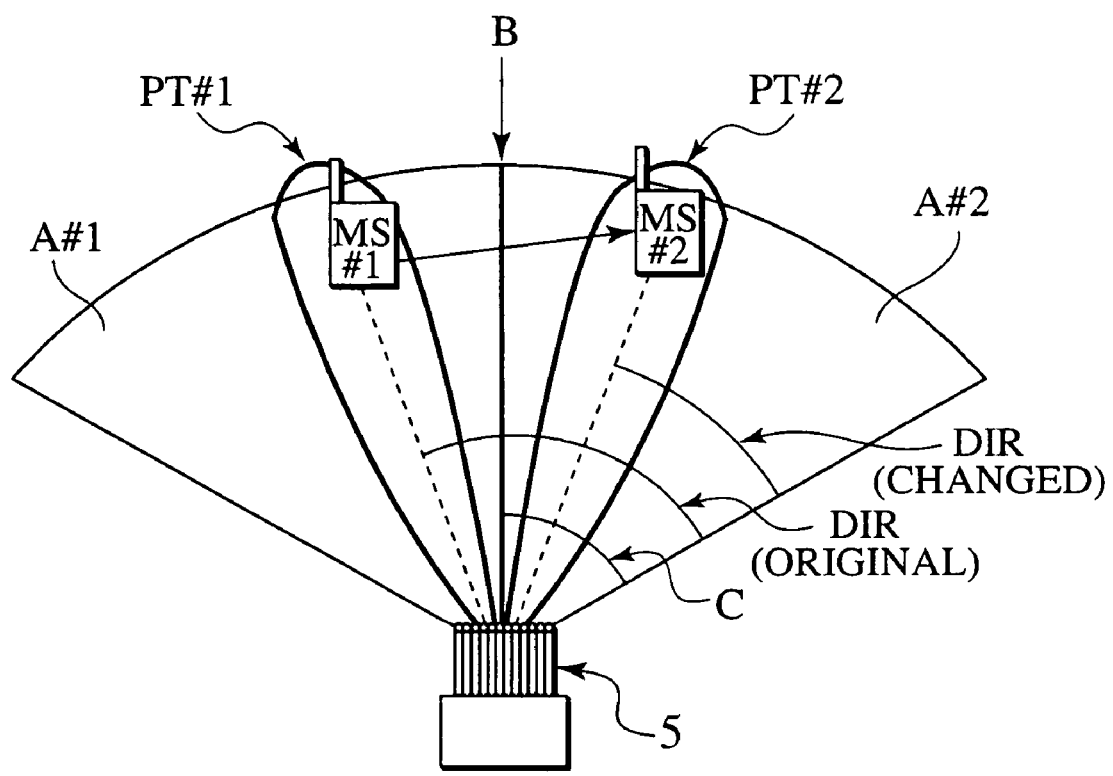
FIG. 11 is an explanatory view showing a cell/sector configuration in the radio communication system according to the second embodiment.
Figure 12:
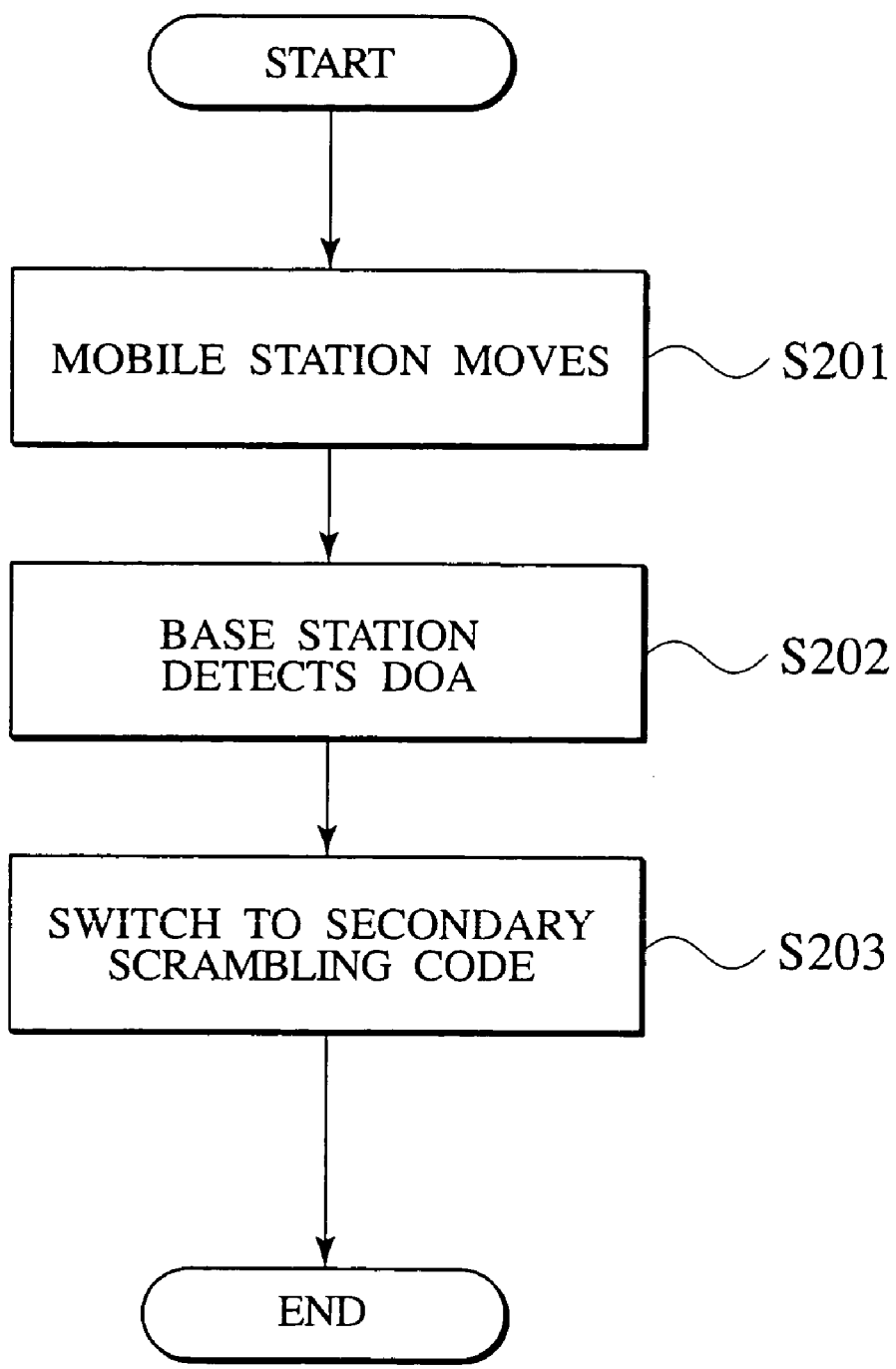
FIG. 12 is a flowchart showing an operation of the radio communication system according to the second embodiment.

As shown in FIG. 11 and FIG. 12, the radio communication system according to the second embodiment can adapt in a case where the primary scrambling code and the secondary scrambling code are used in the sector, and where the mobile station MS moves from the area A#1 to the area A#2 during the communication.

In the examples of FIG. 11 and FIG. 12, the primary scrambling code is used in the area A#1, and the secondary scrambling code is used in the area A#2.

The operation of the radio communication system according to the second embodiment will be described as follows. FIG. 12 shows the operation of the radio communication system in the above example.

In step S201, the mobile station MS receiving the directional beam PT#1 moves from the area A#1 to the area A#2 in the sector.

In step S202, the control signal monitoring unit 6 of the base station BS detects a change of the reception condition of the control signal, and the DOA estimating unit 7 of the base station BS estimates the DOA of the control signal.

In step S203, the area border setting unit 3 of the base station BS notices that the bearing angle DIR of the mobile station MS crosses the set angle C of the area border B.

The scrambling code assigning unit 2 of the base station BS switches the scrambling code to be assigned to the mobile station MS, from the primary scrambling code to the secondary scrambling code, in accordance with the changed bearing angle DIR.

The mobile station MS receives the directional beam PT#2 including the downlink signal which is spread using the secondary scrambling code.

The radio communication system according to the second embodiment can prevent the interference from occurring when the mobile station moves beyond the area border B in the sector during the communication.

[Third Embodiment]

Figure 13:
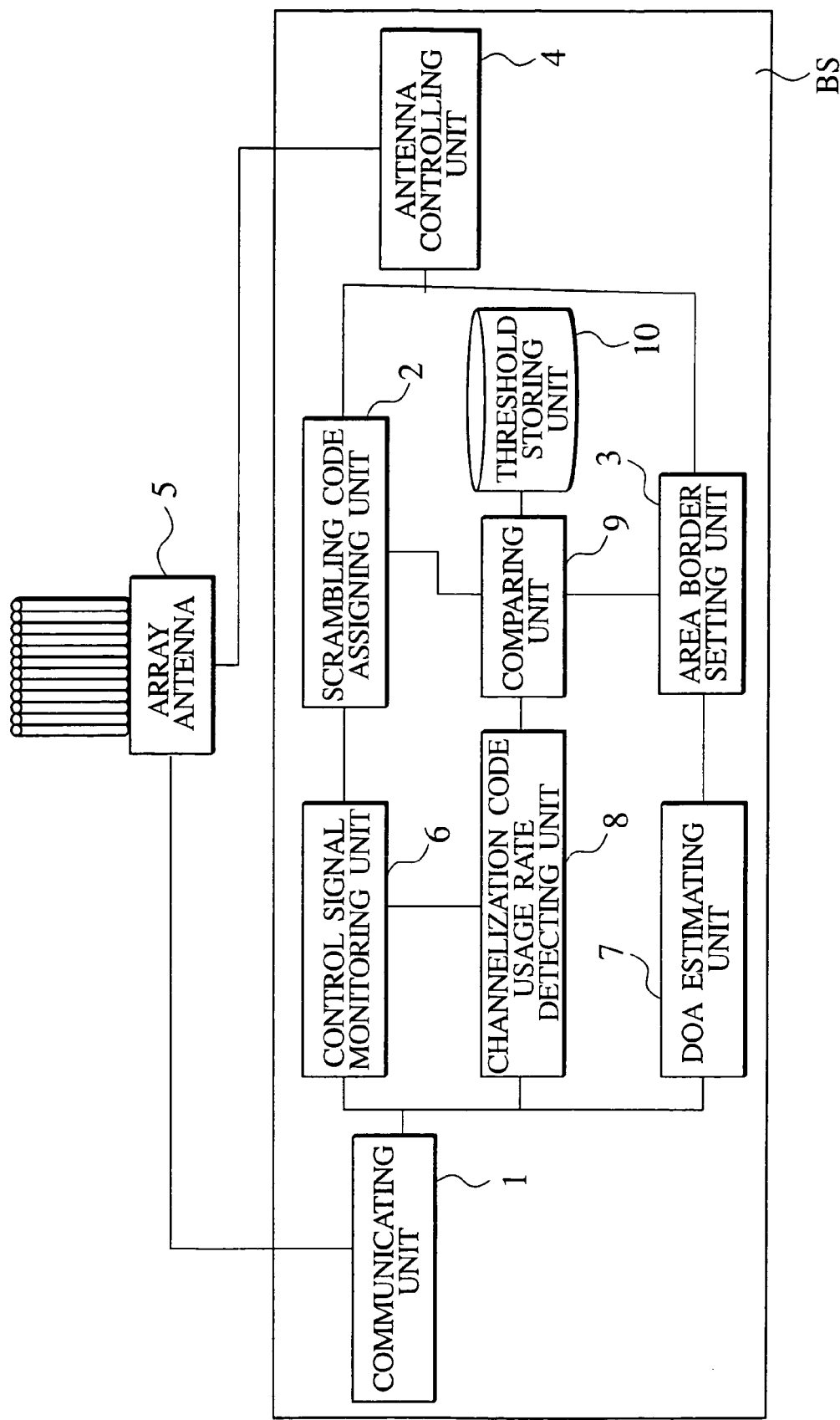
FIG. 13 is a block diagram showing a configuration of a base station in a radio communication system according to a third embodiment.

Referring to FIG. 13 to FIG. 15B, a description will be given of a third embodiment of the present invention. FIG. 13 shows a configuration of a base station BS in a radio communication system according to the third embodiment.

As is the case of the first embodiment or the second embodiment, both the primary scrambling code and the secondary scrambling code are used in the sector in the third embodiment.

In the third embodiment, the base station BS is configured to set the area border between the area A#1 where the primary scrambling code are assigned and the area A#2 where the secondary scrambling code are assigned.

As shown in FIG. 13, the base station BS according to the third embodiment further has a channelization code usage rate detecting unit 8, a comparing unit 9, and a threshold storing unit 10, in addition to the functions of the base station BS according to the second embodiment.

The channelization code usage rate detecting unit 8 is a module configured to detect the channelization code usage rate for spreading the downlink signal which is communicated by the communicating unit 1, in the sector.

The comparing unit 9 is a module configured to compare the detected channelization code usage rate with a predetermined threshold stored in the threshold storing unit 10, so as to output the comparison result to the scrambling code assigning unit 2 and the area border setting unit 3.

The area border setting unit 3 sets the area border B in accordance with the comparison result.

The threshold storing unit 10 is a storage device such as a memory and a hard disk. The threshold storing unit 10 stores the predetermined thresholds which are set in each sector.

Figure 14:
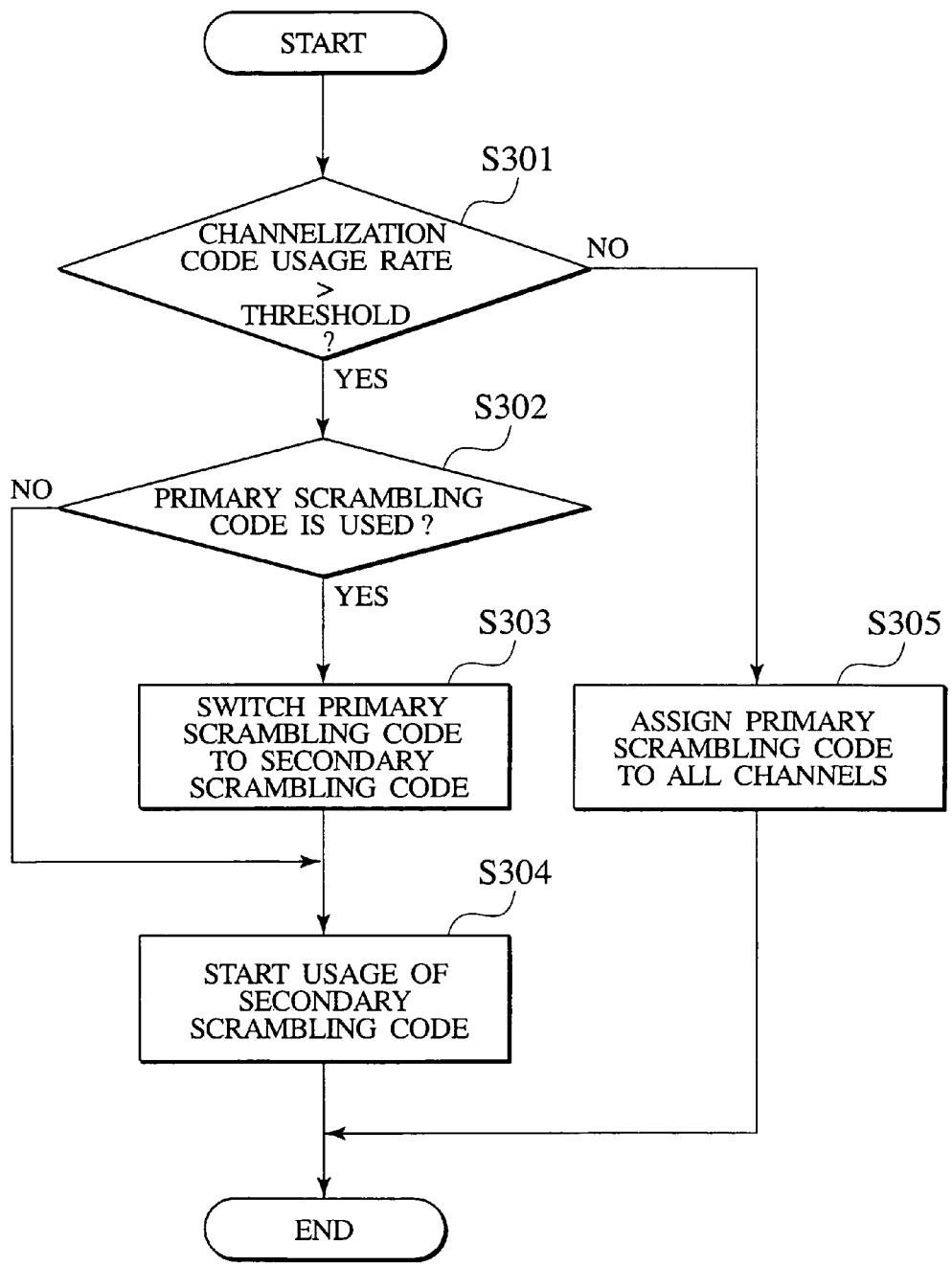
FIG. 14 is a flowchart showing an operation of the radio communication system according to the third embodiment.

The operation of the radio communication system according to the third embodiment will be described as follows. FIG. 14 shows the operation of the radio communication system.

In step S301, the base station BS compares the channelization code usage rate with the predetermined threshold.

To be more specific, the control signal monitoring unit 6 outputs the trigger signals to the DOA estimating unit 7 and the channelization code usage rate detecting unit 8, when detecting a change of the reception condition of the common channel.

The DOA estimating unit 7 starts the DOA estimation in response to the trigger signal, and the channelization code usage rate detecting unit 8 detects the channelization code usage rate in the sector S in response to the trigger signal.

The comparing unit 9 compares the detection result (the detected channelization code usage rate) with the predetermined threshold stored in the threshold storing unit 10.

Figure 15A:
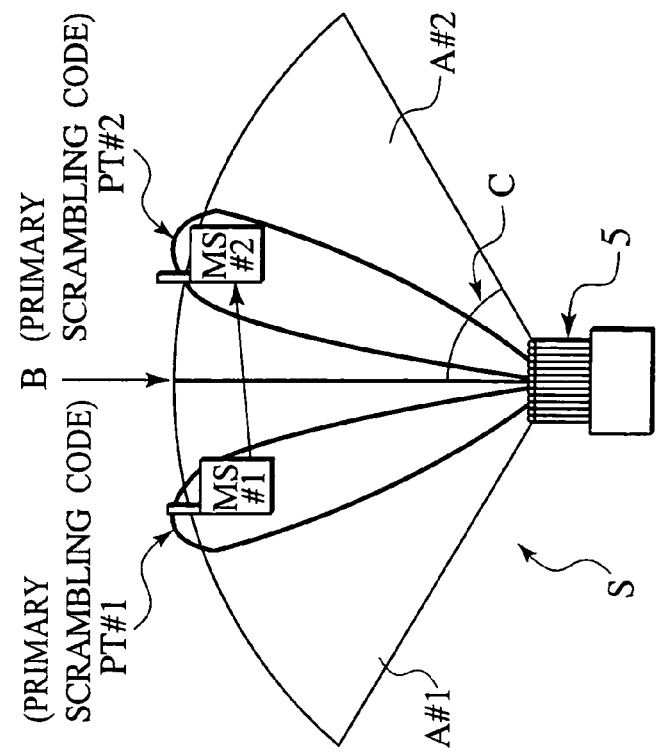
FIGS. 15A and 15B are explanatory views showing cell/sector configurations in the radio communication system according to the third embodiment.

In step S305, the scrambling code assigning unit 2 assigns the primary scrambling codes to the all channels (the transmission beam patterns PT#1 and PT#2) without assigning the secondary scrambling codes as shown in FIG. 15A, when the channelization codes are not exhausted, that is to say, when the channelization code usage rate is not larger than the predetermined threshold in step S301.

On the other hand, in step S302, the comparing unit 9 judges whether the mobile station MS located in the area where the secondary scrambling code is assigned, is using the primary scrambling code or not, when the channelization code usage rate is larger than the predetermined threshold in step S301.

To be more specific, the comparing unit 9 judges whether the mobile station MS using the primary scrambling code is located in the area A#2, by comparing the DOA estimated by the DOA estimating unit 7 with the current area border B.

Figure 15B:
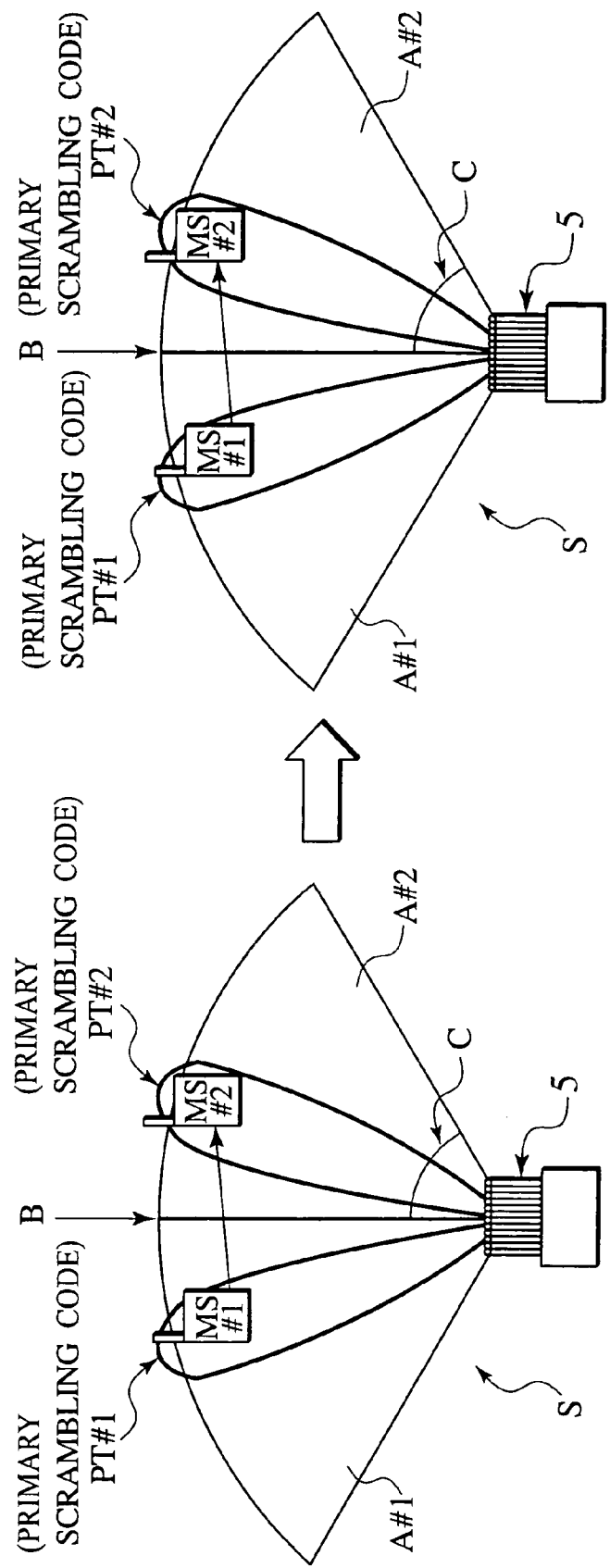

In step S303, the scrambling code assigning unit 2 switches the scrambling code to be assigned to the mobile station MS, from the primary scrambling code to the secondary scrambling code, as shown in FIG. 15B, when the mobile station MS using the primary scrambling code is located in the area A#2. Then, in step S304, the usage of the secondary code starts for the mobile station MS in the area A#2.

The radio communication system according to the third embodiment can assign the scrambling code in accordance with the channelization code usage rate, and can switch the scrambling code to be assigned to the mobile station located in the area as appropriate, so as to prevent the usage of the secondary scrambling code which is more susceptible to interference than the primary scrambling code, when the channelization code usage rate is smaller than the predetermined threshold.

[Fourth Embodiment]

Figure 16:
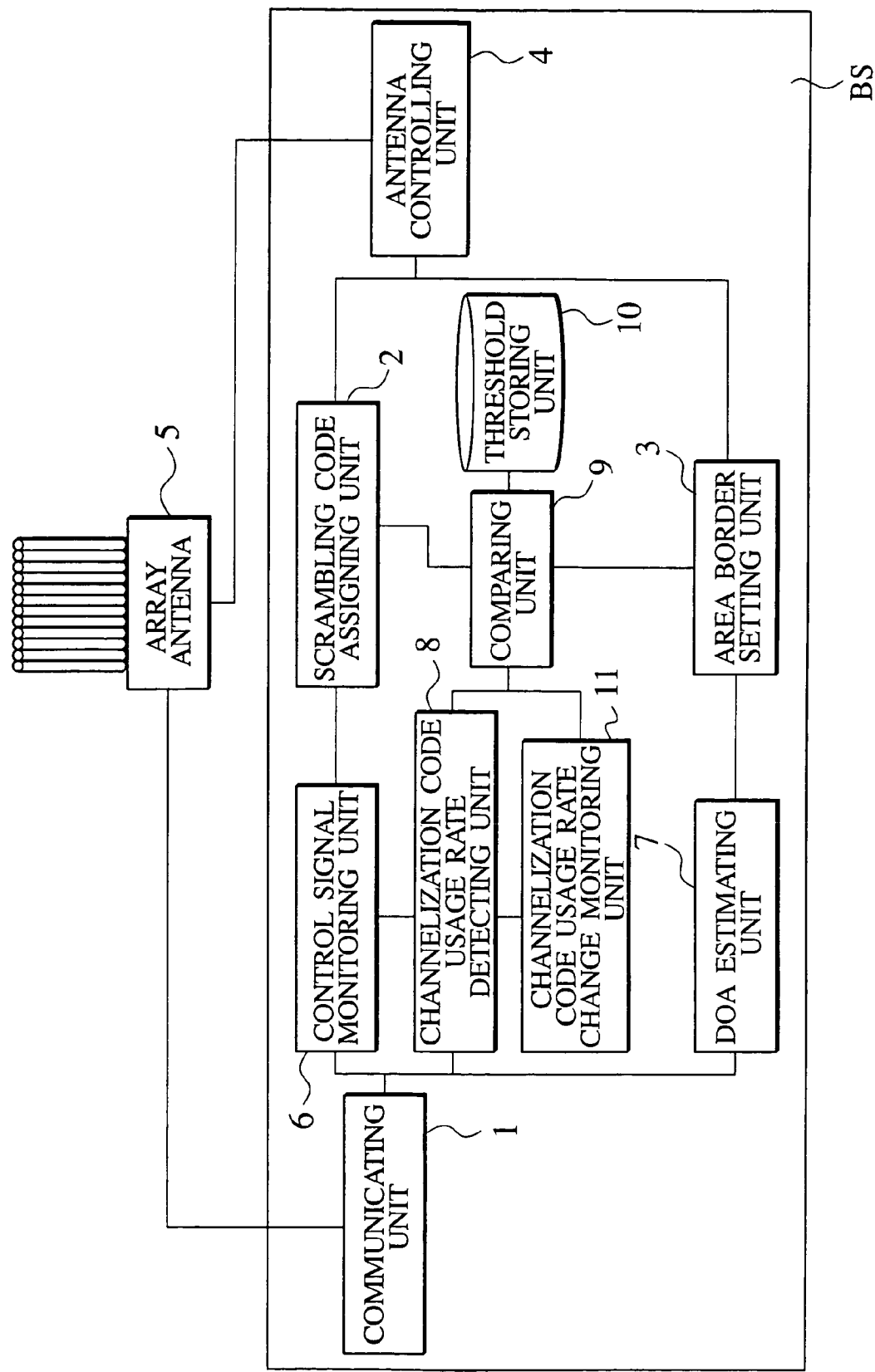
FIG. 16 is a block diagram showing a configuration of a base station in a radio communication system according to a fourth embodiment.
Figure 17:
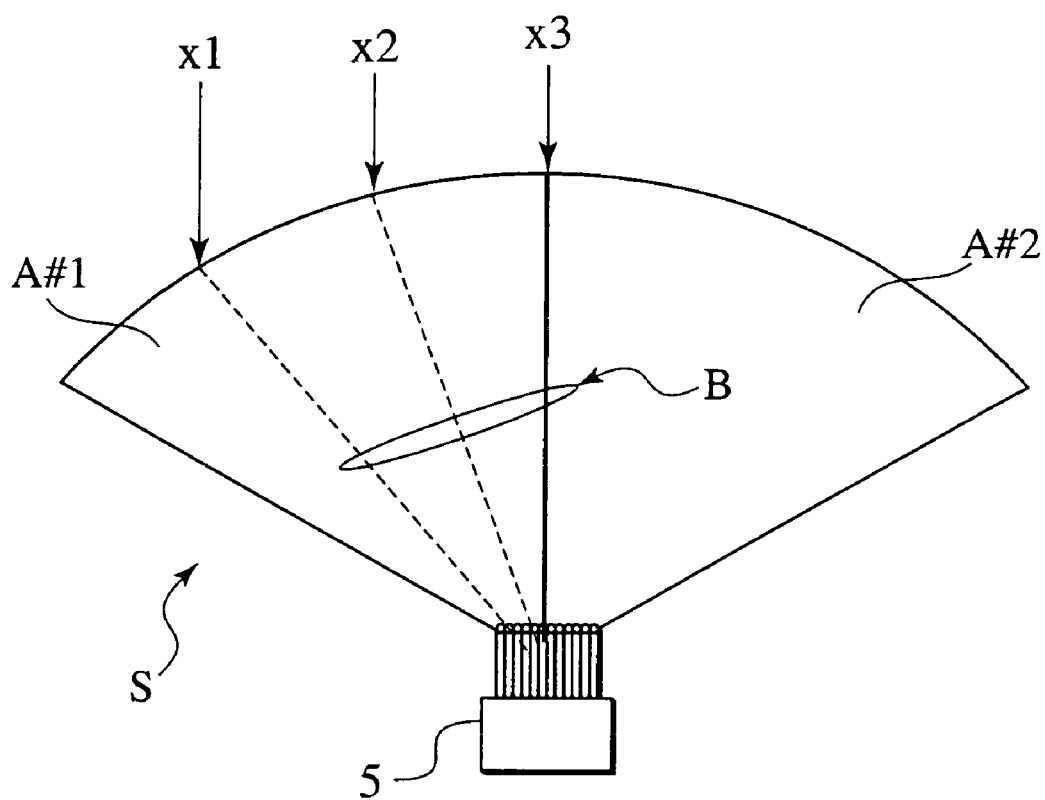
FIG. 17 is an explanatory view showing a cell/sector configuration in the radio communication system according to the fourth embodiment.
Figure 18:
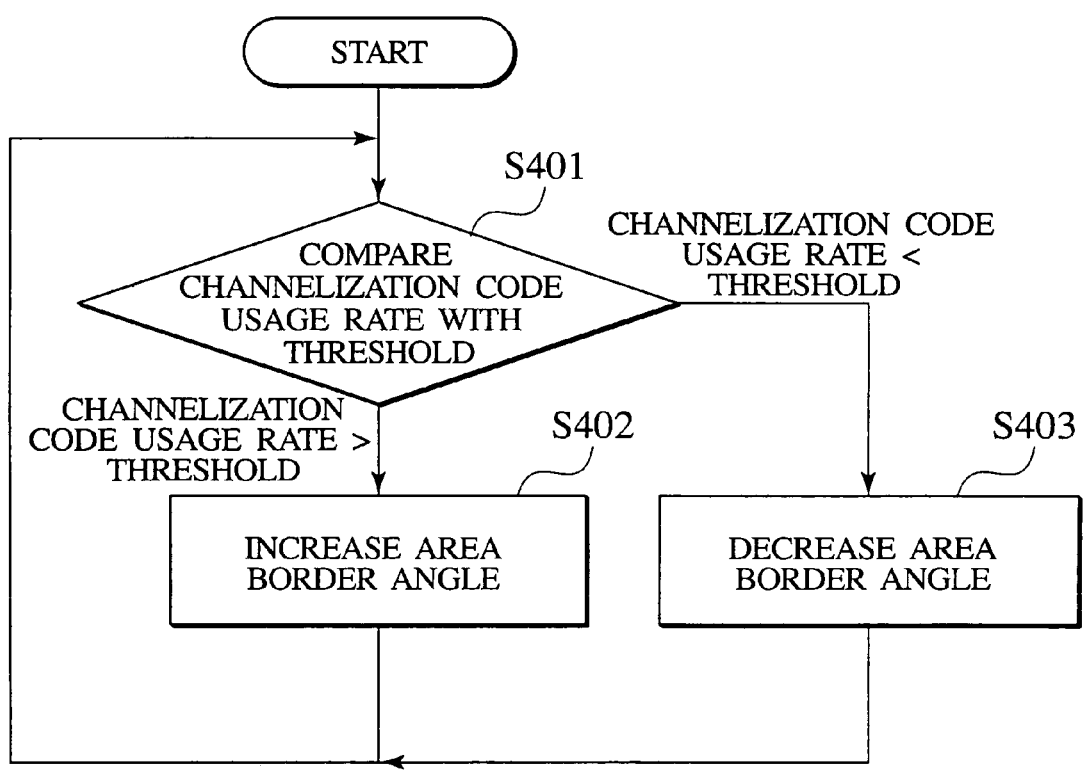
FIG. 18 is a flowchart showing an operation of the radio communication system according to the fourth embodiment.

Referring to FIG. 16 to FIG. 18, a description will be given of a fourth embodiment of the present invention. FIG. 16 shows a configuration of a base station BS in a radio communication system according to the fourth embodiment.

As is the case of the first embodiment, the second embodiment, or the third embodiment, both the primary scrambling code and the secondary scrambling code are used in the sector in the third embodiment. The base station BS transmits the common channel including the control signal which is spread using the primary scrambling code to the whole sector S.

In the fourth embodiment, the base station BS is configured to store a plurality of predetermined thresholds, to expand the area where the secondary scrambling codes are used each time the channelization code usage rate code is larger than the selected predetermined threshold, and to narrow the area where the secondary scrambling codes are used each time the channelization code usage rate is smaller than the selected predetermined threshold.

As shown in FIG. 16, the base station BS according to the fourth embodiment further has a channelization code usage rate change monitoring unit 11, in addition to the functions of the base station BS according to the third embodiment.

The threshold storing unit 10 stores a plurality of thresholds which are set in stages in accordance with the channelization code usage rate.

The channelization code usage rate change monitoring unit 11 is a module configured to be connected to the channelization code usage rate detecting unit 8, and to monitor a change of the channelization code usage rate detected by the channelization code usage rate detecting unit 8.

When the change of the channelization code usage rate is detected, the channelization code usage rate change monitoring unit 11 notifies the change to the comparing unit 9.

As shown in FIG. 17, the comparing unit 9 selects the predetermined threshold from among the thresholds stored in the threshold storing unit 10, in accordance with the notification, so as to compare the channelization code usage rate after the change with the selected predetermined threshold.

The area border setting unit 3 sets the area border B in accordance with the comparison result. To be more specific, the area border setting unit 3 sets the area border B so as to increase the size of the area in which the secondary scrambling code is used when the channelization code usage rate becomes larger than the predetermined threshold. On the other hand, the area border setting unit 3 sets the area border B so as to decrease the size of the area in which the secondary scrambling code is used when the channelization code usage rate becomes smaller than the predetermined threshold.

The primary scrambling code is assigned to the common channel in the fourth embodiment.

The operation of the radio communication system according to the fourth embodiment will be described as follows. FIG. 18 shows the operation of the radio communication system.

In the fourth embodiment, the primary scrambling codes are used in the area A#2, and the secondary scrambling codes are used in the area A#1.

In step S401, the channelization code usage rate detecting unit 8 periodically detects the channelization code usage rate in the sector S, and outputs the detection result to the channelization code usage rate change monitoring unit 11. The channelization code usage rate change monitoring unit 11 monitors whether the channelization code usage rate has changed or not. Each time the channelization code usage rate has changed, the channelization code usage rate change monitoring unit 11 notifies the change to the comparing unit 9. The comparing unit 9 compares the channelization code usage rate with the selected predetermined threshold, in accordance with the notification.

The area border setting unit 3 changes the area border B in accordance with the comparison result transmitted from the comparing unit 9.

To be more specific, in step S402, the area border setting unit 3 changes the area border B so as to expand the area A#1 where the secondary scrambling codes are used, each time the channelization code usage rate is larger than the selected threshold. For example, in this case, the area border setting unit 3 changes the position of the area border B from the position 'x1' to the position 'x2', or from the position 'x2' to the position 'x3'.

On the other hand, in step S403, the area border setting unit 3 changes the area border B so as to narrow the area A#2 where the secondary scrambling codes are used, each time the channelization code usage rate is smaller than the selected threshold. For example, in this case the area border setting unit 3 changes the position of the area border B from the position 'x3' to the position 'x2', or from the position 'x2' to the position 'x1'.

The processes of the steps S401 to S403 are repeated by loop process, so that the area border can be set so as to follow the change of the channelization code usage rate at all times.

As a result, the radio communication system transmitting and receiving the common channels using the primary scrambling codes can minimize the usage of the secondary scrambling code which is more susceptible to the interference than the primary scrambling code.

As described above, the present invention can mix the channels using the primary scrambling code and the secondary scrambling code in the same sector, and can increase the communication capacity by avoiding the interference limiting the usage of the channelization codes.

To be more specific, for example, when the channelization codes are exhausted in the sector, the radio communication system can make effective use of the channelization codes by using the primary scrambling code and the secondary scrambling code, so as to prevent the interference between the channels using the different scrambling codes from occurring, and to make the most effective use of the channelization codes.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A base station for transmitting a downlink signal to a mobile station located in a sector managed by the base station, the downlink signal being spread using a scrambling code and a channelization code, the base station comprising:
a threshold memory configured to store a plurality of thresholds;
a comparer configured to compare a channelization code usage rate with a predetermined threshold, the predetermined threshold being selected from among the stored thresholds in accordance with a change of the channelization code usage rate;
an area border setter configured to separate the sector into a plurality of areas, by setting an area border in the sector, in accordance with a comparison result;
a scrambling code assigner configured to assign a different scrambling code to each of the separated areas; and
a spreader configured to spread the downlink signal using the assigned scrambling code and the channelization code in each of the separated areas.

2. The base station according to claim 1, wherein the area border setter comprises an array antenna configured to separate the sector into a plurality of areas, by controlling a horizontal angle of a directional beam for transmitting the downlink signal in accordance with the set area border.

3. The base station according to claim 1, wherein the area border setter sets the area border so as to expand the area in which the scrambling code different from a scrambling code assigned to a common channel is used, when the channelization code usage rate becomes larger than the predetermined threshold.

4. The base station according to claim 1, wherein the area border setter sets the area border so as to narrow the area in which the scrambling code different from a scrambling code assigned to a common channel is used, when the channelization code usage rate becomes smaller than the predetermined threshold.

5. A radio communication method for transmitting a downlink signal to a mobile station located in a sector managed by a base station, the downlink signal being spread using a scrambling code and a channelization code, the method comprising the steps of:

storing a plurality of thresholds;

comparing a channelization code usage rate in the sector with a predetermined threshold, the predetermined threshold being selected from among the stored thresholds in accordance with a change of the channelization code usage rate;

separating the sector into a plurality of areas, by setting an area border in the sector, in accordance with a comparison result;

assigning a different scrambling code to each of the separated areas; and spreading the downlink signal using the assigned scrambling code and the channelization code in each of the separated areas.

* * * * *